June 23, 1970  R. H. GEORGE  3,516,231
AFTERCOOLER
Filed May 24, 1968
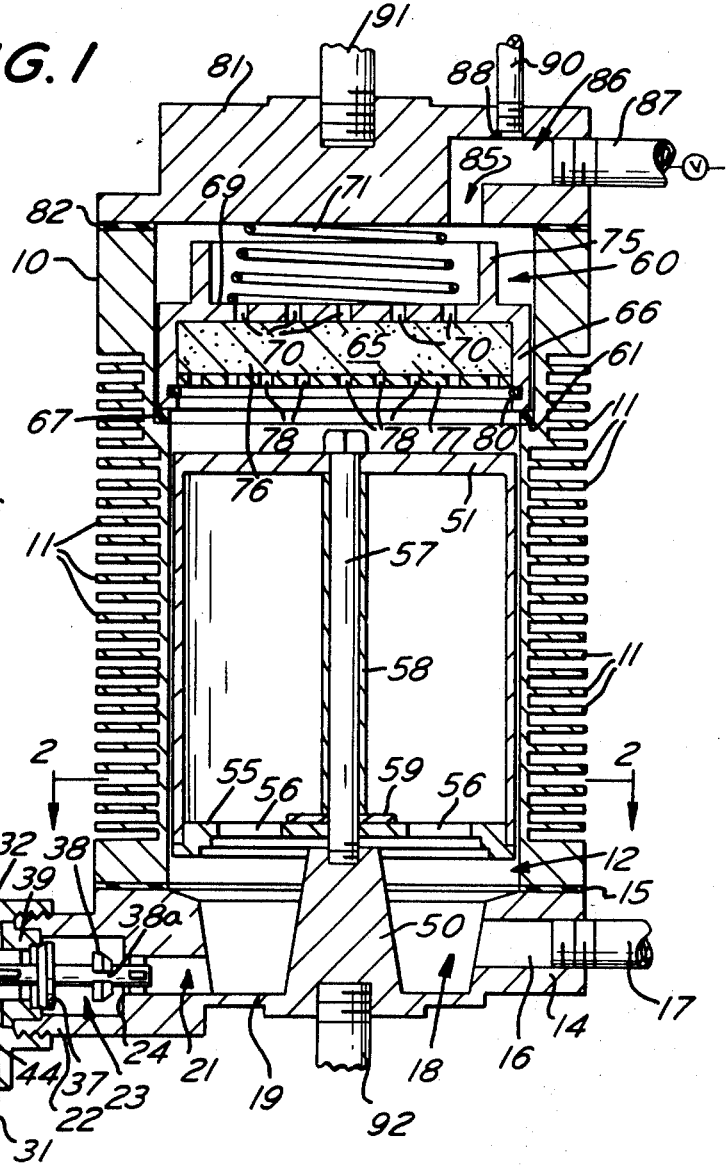
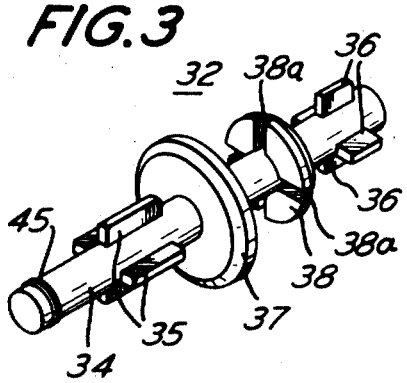
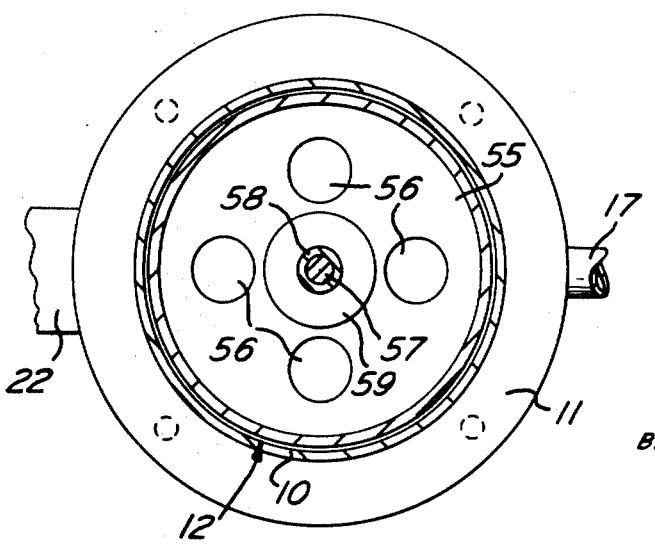
INVENTOR
ROBERT H. GEORGE
BY
ATTORNEY United States Patent Office 3,516,231
Patented June 23, 1970

3,516,231
AFTERCOOLER
Robert H. George, Melrose Park, Pa., assignor to Brakemaster Corporation, Philadelphia, Pa., a corporation of Pennsylvania
Filed May 24, 1968, Ser. No. 731,789
Int. Cl. B01d 35/18
U.S. Cl. 55—267                                    5 Claims

ABSTRACT OF THE DISCLOSURE

An aftercooler which is suitable for use in the air supply line between an air compressor and a reservoir having means for filtering out and collecting contaminants, cleaning the filter and unloading between compressor operating cycles.

BACKGROUND OF THE INVENTION

Field of the invention

This invention relates to an aftercooler used between the compressor and reservoir in an air supply line which cools the air from the compressor, filters out water and dirt, condenses moisture and oil vapors into liquids, entraps carbon and dirt, automatically ejecting the contaminants every compressor cycle and automatically unloading the aftercooler to atmospheric pressure between each compressor cycle.

Description of the prior art

Many devices have been proposed for use in air systems to cool the air coming from the compressor and to filter out the contaminants. The air as it enters the aftercooler may be in the range of from 100 to 300° F. The trip through the aftercooler must reduce the temperature of the air in order to remove by condensation contaminants such as water, oil, and carbon, and consequently reduce the wear on the air system. These contaminants which form what is known in the art as emulsified oil must be removed from the aftercooler and while present therein kept at a temperature above the freezing point. One such aftercooler is shown in my prior Pat. No. 2,840,183. This device required an electric heater which was fragile and required frequent checking and maintenance, lacked an automatic drain valve and under certain conditions could become clogged. The present aftercooler automatically drains off the collected contaminants, cleans its filter, unloads between cycles and does not require any auxiliary heater to prevent freezing.

SUMMARY OF THE INVENTION

An aftercooler for use in an air line between an air compressor and reservoir which automatically drains off collected contaminants, purges its filter, unloads between cycles, and does not freeze up at low temperatures.

The principal object of the present invention is to provide an aftercooler which filters out contaminants from the air delivered thereto and reduces the temperature of the air.

A further object of the present invention is to provide an aftercooler that automatically drains off collected contaminants A further object of the present invention is to provide an aftercooler having a filter and which purges itself automatically.

A further object of the present invention is to provide an aftercooler that unloads between cycles thereby reducing the compressor starting load and increasing its life.

A further object of the present invention is to provide a large volume of air above the filter element which will by its volume provide sufficient volume when expanded from high pressure into atmosphere to thoroughly scour out contaminants in the aftercooler.

A further object of the present invention is to provide an aftercooler that is simple in construction, has a long life and requires little maintenance.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 1 is a vertical central sectional view of an aftercooler in accordance with the present invention;

FIG. 2 is a horizontal sectional view taken approximately on the line 2—2 of FIG. 1; and FIG. 3 is an enlarged view in perspective of a valve used with the apparatus of the present invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the aftercooler includes an outer housing 10 of cylindrical shape and with a plurality of annular cooling fins 11. The housing 10 is hollow, open at both ends and provided with an internal bore 12.

The housing 10 is closed at the bottom by a lower header 14 held thereto by a plurality of screws (not shown) in a conventional manner. A gasket 15 is provided between the housing 10 and lower header 14 to prevent fluid leakage.

The header 14 has a threaded inlet opening 16 therein with a pipe 17 engaged therewith and connected to an air compressor (not shown) of conventional type and well known in the art. The opening 16 communicates with an annular cavity 18 in header 14 which provides a tray 19 for collection of contaminants and also permits the passage of air from opening 16.

At the opposite side of the header 14 to the inlet opening 16, a drain outlet opening 21 is provided, also communicating with the cavity 18. An enlarged boss portion 22 is formed as part of the header 14 and has an enlarged internal bore 23 which the opening 21 intersects. A shoulder 24 is formed by the intersection of bore 23 and the opening 21. A cap 25 is in threaded engagement with the outside of boss 22 and has a threaded inlet opening 26 with pipe 27 therein connected to a governor unloader mechanism G, shown diagrammatically of conventional type to supply pressure between successive operations of the compressor with relief of pressure when the compressor is operating. The cap 25 has a threaded outlet opening 30 with pipe 31 therein connected to atmosphere for disposal of contaminants and for unloading the aftercooler.

A valve 32, as shown more fully in FIG. 3, is mounted in opening 21, bore 23 and in bore 33 of cap 25. The valve 32 is provided with stem 34, guide fins 35 and 36, valve flange 37 and stop flange 38 with slots or fluid passageways 38a.

The valve flange 37 is adapted to engage valve seat 39, which is of circular shape and held between cap 25 and boss 22, and cut off fluid flow when engaged. The flange 38 may engage the shoulder 24 to provide a stop for movement of valve 32. A valve opening piston 40 abuts stem 34 and is provided with a peripheral U cup seal packing 42 engaging bore 23. A spring 43 on stem 34 engages with piston 40 forcing piston 40 out of the way so that spring 44 can seat flange 37 on seat 39. A spring 44 engaging a retaining ring 45 mounted on the valve stem 34 and engaging the valve seat 39 urges the valve flange 37 to seated position when no pressure is urging the piston 40 in the opposite direction.

The header 14 is provided with a central upright boss 50 which extends vertically upwardly into bore 12 of housing 10. A cylindrical baffle 51 of cup shape and open at the bottom end is provided in bore 12 and whose outer diameter is less than that of bore 12, to provide a space for air to pass. The baffle 51 is closed at the lower open end by a circular plate 55 provided with four holes 56. A bolt 57 engaged with and holding the baffle 51 in place passes through the baffle 51, plate 55 and is threadably engaged in the boss 50. A spacer 58 on bolt 57 inside baffle 51 engages washer 59 on plate 55. The spacer 58 holds the baffle 51 and plate 55 at a controlled distance and limits the pressure on plate 55.

Above baffle 51 the housing 10 has a bore 60 of larger diameter than bore 12 and is provided with an annular shoulder 61.

A flter cup 65 in bore 60 has its outer lower rim 66 engaging a gasket 67 on the shoulder 61. The filter cup 65 is of cylindrical shape with upper fixed plate portion 69. The plate 69 is perforated with a plurality of holes 70. A filter seating and holddown spring 71 engages the plate 69 and is retained thereon by an upper rim 75 of the filter cup 65.

A sponge 76 is provided within the filter cup 65 below plate 69 and retained therein by a lower plate 77 which is perforated with a plurality of holes 78 and removably held in filter cup 65 by a retaining spring 80.

The sponge 76 may be of any suitable material, stainless steel having been found to possess the desired characteristics of permeability and corrosion resistance as well as good filtration.

The housing 10 is closed at the top by an upper header 81 of generally cylindrical shape held thereon by screws (not shown) and with a gasket 82 between the header 81 and housing 10 to prevent the leakage of air thereby. The header 81 provides an upper support for the spring 71.

The header 81 has an inlet opening 85 therein communicating with bore 60 and with threaded outlet opening 86. The opening 86 has a delivery pipe 87 therein which is connected to a reservoir (not shown). A connection 90 to a safety valve (not shown) of well known type is engaged in opening 88 which also communicates with opening 86, the connection 90 extending vertically upwardly in a well known manner.

If desired cap screw hangers 91 and 92 may be provided respectively engaged in upper and lower headers 14 and 81 to provide for securely mounting the aftercooler to the automotive vehicle.

The mode of operation will now be pointed out.

The compressor (not shown) is activated and air under pressure delivered into housing 10 through pipe 17, outlet opening 16 and cavity 18. The air flows upwardly into baffle 51 through holes 56 filling baffle 51, the air then flows in bore 12 in the space between the bore 12 and the baffle 51 for cooling and through sponge 76 of filter cup 65 where dirt and other contaminants are removed.

The air then exits through opening 85, opening 86 and pipe 87 to a reservoir (not shown).

Water and oil entering the housing 10 are thrown out by change of direction of air flow. Air entering through pipe 17 changes direction by 90 degrees on flow into cavity 18, another 90 degrees on flowing into bore 12 and another 90 degrees on flowing into the annular passage. A total of three 90 degree flow direction changes occur on flow through the filter cup 65 and out pipe 87.

It should be noted that the interior of the aftercooler is under equal pressure and that condensed moisture will flow by gravity down into cavity 18 whose capacity for this illustration is calculated to be at fifty times the probable condensation in any single compressor cycle.

Between cycles the governor unloader mechanism G applies air pressure througn pipe 27 to piston 40 of valve 32 moving the valve flange 37 off valve seat 39 whereby water, oil and dirt in tray 19 are forced out through opening 21, bore 23, opening 30 and pipe 31 to atmosphere by the air pressure in the housing 10.

The air back flow from the reservoir (not shown) is cut off by a check valve V in pipe 87 but the air in the top of the housing 10 above filter cup 65 which is under pressure flows downwardly through sponge 76 of filter cup 65 forcing out dirt and other contaminants and carrying them down to tray 19 for discharge. When the governor closes pressure is released on piston 40 so that pressure is released on valve 32 which closes, the compressor is re-activated and continues as desired.

It should be noted that if the filter 65 should become clogged the air pressure will force the filter cup 65 upwardly against the force of the spring 71 off gasket 67 and the air will flow into bore 60 thence through bore 85 into pipe 87 and the reservoir as previously explained. In addition the high temperature of the incoming air which is at 100 to 300 degress F. will raise the temperature of the header 14, boss 22 and valve 32 to a point far above freezing. The heat will flow past the bottom plate 55 of baffle 51, upward past fins 11 and will be dissipated. The heating of header 14 by the incoming air eliminates the requirement for a separate heater common in all aftercoolers heretofore available.

I claim:
1. An aftercooler for cooling and cleaning compressed air which comprises
   a tubular housing having cooling fins on the outside thereof and having inlet and outlet ends with an interior space therebetween, and
   an outlet header member across the outlet end and closing the outlet end of the housing and a metallic inlet header member across the inlet end and closing the inlet end of the housing,
   an air inlet connection in the inlet header member at one side thereof for delivery of heated and contaminated air to the inlet end of said interior space and for heating of said inlet header member,
   an air delivery connection in the outlet header member communicating with said interior space at one side thereof for delivery of air therefrom,
   said inlet header member defining a cavity therein for separation and collection of sludge therein,
   baffle means in the interior space contiguous to said collecting cavity, and including a tubular baffle member closed at the top in spaced relation to the interior of said housing for flow of air therealong,
   filter means transversely disposed in said housing spaced between said outlet header member and said baffle means to provide an air space therebetween,
   valve means connected to said air delivery connection for terminating air flow downstream of said filter means,
   a fluid discharge connection extending from said cavity through said inlet header, and
   fluid pressure controlled valve means carried by said inlet header member for controlling the discharge through said discharge connetcion from said cavity and back flushing through said filter means and along said baffle by air from said air space.
2. An aftercooler as defined in claim 1 in which
   said housing has a seat therein,
   said filter means is movably mounted in said interior space and in engagement with said seat, and
   resilient means is provided for normally retaining said filter means in seated position but permitting move- ment of said filter means away from said seat upon clogging of said filter means.

3. An aftercooler as defined in claim 1 in which said valve means has an intermittently acting fluid pressure supply connected thereto.

4. An aftercooler as defined in claim 1 in which said valve means includes a valve plug carried by said inlet header member and having a seating flange portion normally seated to prevent fluid discharge from said cavity, and
said valve means includes a head against which pressure is applied from said supply means for moving said flange portion for discharge of collected material in said cavity and reduction of pressure in said interior space.

5. An aftercooler as defined in claim 1 in which said baffle member has a hollow interior in communication with said cavity.

References Cited

UNITED STATES PATENTS

| | | | |
|---|---|---|---|
| 423,097 | 3/1890 | Vielhaber | 137—204 |
| 1,458,005 | 6/1923 | Rohrer | 55—267 |
| 1,735,441 | 11/1929 | Paffen et al. | 55—311 |
| 2,509,880 | 5/1950 | Pelton. | |
| 2,535,760 | 12/1950 | Sherman et al. | |
| 2,537,224 | 1/1951 | Lansdale et al. | 137—204 |
| 2,687,841 | 8/1954 | Churchman | 137—204 |
| 2,840,183 | 6/1958 | George | 55—267 |
| 3,002,584 | 10/1961 | Jerabek et al. | 55—471 |
| 3,067,762 | 12/1962 | Parsons. | |
| 3,093,467 | 6/1963 | McLaughlin. | |
| 3,343,345 | 9/1967 | Carolan | 55—526 |
| 3,402,529 | 9/1968 | Frantz | 55—167 |
| 2,812,860 | 11/1957 | Dilworth | 55—302 |
| 3,426,508 | 2/1969 | McGrath | 55—309 |

FRANK W. LUTTER, Primary Examiner

BERNARD NOZICK, Assistant Examiner

U.S. Cl. X.R.

55—288, 302, 309, 432, 522; 137—204